United States Patent [19]

Yaniv et al.

[11] Patent Number: 4,678,282
[45] Date of Patent: Jul. 7, 1987

[54] ACTIVE DISPLAY MATRIX ADDRESSABLE WITHOUT CROSSED LINES ON ANY ONE SUBSTRATE AND METHOD OF USING THE SAME

[75] Inventors: Zvi Yaniv; Walter E. Chapelle, both of Southfield; Shui-Chih A. Lien, Clawson; Mohshi Yang, Troy, all of Mich.

[73] Assignee: Ovonic Imaging Systems, Inc., Troy, Mich.

[21] Appl. No.: 702,996

[22] Filed: Feb. 19, 1985

[51] Int. Cl.$^4$ ............................................. G02F 1/133
[52] U.S. Cl. ..................... 350/334; 350/333; 350/336; 357/2; 357/23.7
[58] Field of Search ................ 350/333, 334, 336; 357/23.7, 2

[56] References Cited
U.S. PATENT DOCUMENTS

| | | | |
|---|---|---|---|
| 3,862,360 | 1/1975 | Dill et al. | 350/334 |
| 4,094,582 | 6/1978 | Goodman. | |
| 4,409,605 | 10/1983 | Ovshinsky et al. | 357/2 |
| 4,448,491 | 5/1984 | Okubo. | |

FOREIGN PATENT DOCUMENTS

| | | |
|---|---|---|
| 0145520 | 10/1984 | European Pat. Off. . |
| 3325134 | 1/1984 | Fed. Rep. of Germany . |

*Primary Examiner*—John K. Corbin
*Assistant Examiner*—Martin Lerner
*Attorney, Agent, or Firm*—Marvin S. Siskind; Richard M. Goldman

[57] ABSTRACT

A light influencing display is provided which has a plurality of pixel group, each pixel of which includes a first electrode formed on a first surface and an opposing, second electrode formed on a second surface. A separate three terminal control device of deposited semiconductor material is formed on the first surface in association with each pixel. Each control device has a control terminal and two current path terminals, a first of which is connected to the first electrode of the control device's associated pixel. A voltage supply lead is formed on the first surface in association with each pixel group, and is connected to the second current path terminals associated with its pixel group. Similarly, a control lead is formed on the first surface in association with each pixel group, and is connected to the control terminals associated with its pixel group. A plurality of conductive data leads is formed on the second surface, with a data lead being electrically connected to each second electrode of a given pixel group. As a result, a desired voltage can be applied between the electrodes of a given pixel by using a selected control lead to turn on the control devices of that pixel's pixel group, and by using a selected data lead to supply a data voltage to its second electrode. The present invention allows x - y addressing of an active matrix display without crossing address lines on either the first or second surface, avoiding the risk of short circuits between such lines. It also allows the voltage supply and control leads associated with adjacent pixel groups to be combined, greatly reducing the number of lines required in such a display.

39 Claims, 13 Drawing Figures

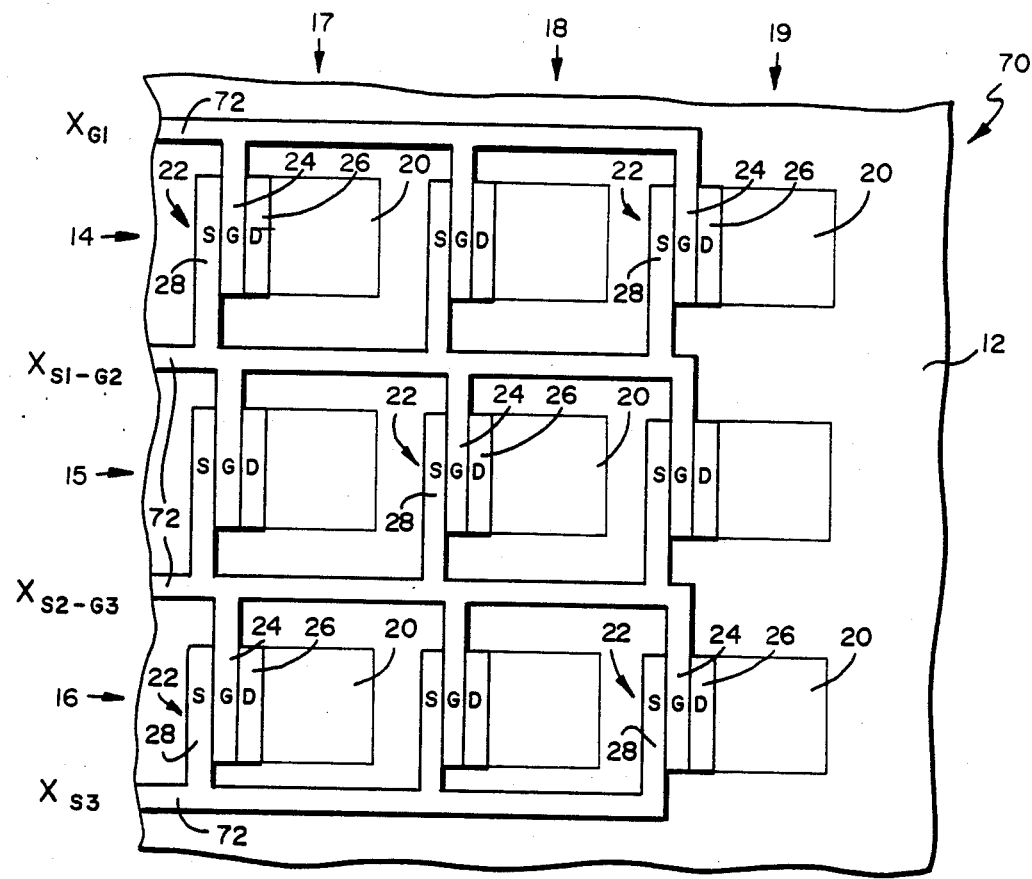
FIG. 10
FIG. 11
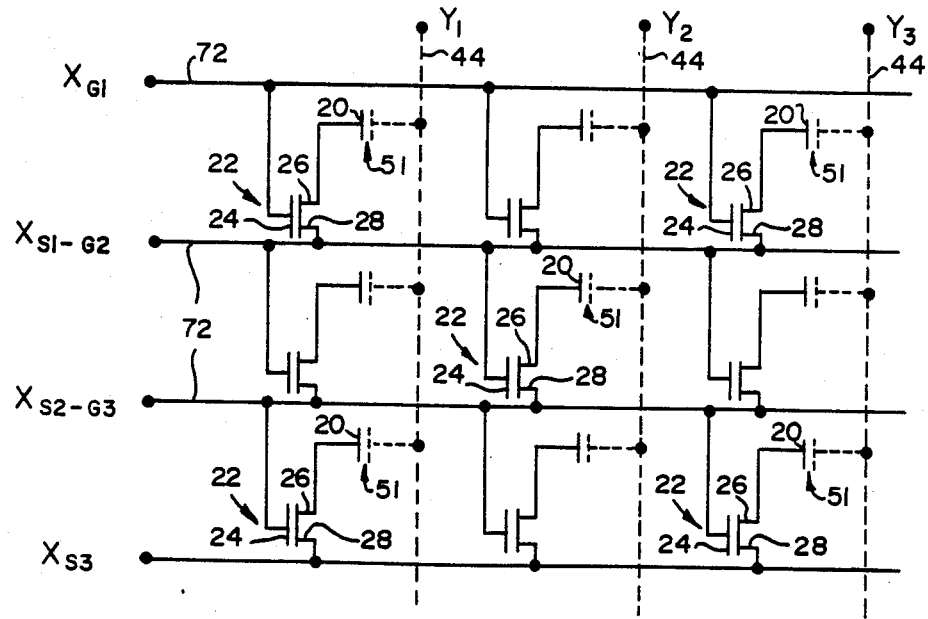

ACTIVE DISPLAY MATRIX ADDRESSABLE WITHOUT CROSSED LINES ON ANY ONE SUBSTRATE AND METHOD OF USING THE SAME

FIELD OF THE INVENTION

The present invention relates generally to light influencing displays and more particularly to active matrix displays in which each display element is controlled by a separate three terminal control device, such as a transistor, and to methods of using the same.

BACKGROUND OF THE INVENTION

Light influencing displays are well known in the prior art. They include liquid crystal, electroluminescent, and electrochromic displays.

It is common in such displays for there to be a plurality of individually addressable picture elements, called pixels, each having has a separate pair of opposing pixel electrodes, with light influencing material between them. Voltages are selectively applied to the electrode pairs, causing the light influencing material between them to emit light or change optical density. Commonly these opposing pixel electrodes are located on opposing substrates, such as opposing glass plates, with the light influencing material, such as liquid crystal material, located between the substrates.

In relatively small arrays of pixels, such as those found in many digital watches it is common to have all the pixel electrodes on one substrate connected in common and to have a separate address line for selectively applying voltages to each of the pixel electrodes on the second substrate, thus enabling each pixel to be individually selected. However, in large arrays, such as large x-y arrays, it proves impractical to have a separate address line connected to each pixel because too much room would be required by so many lines. Thus, in displays with many pixels it is common to use x-y matrix addressing, in which all the bottom pixel electrodes of a given row are connected to an address line associated with that row and all the top pixel electrodes of a given column are connected to an address line associated with that column. This enables each pixel to be addressed by selecting its associated x and y address lines.

In relatively small x-y arrays each of the x and y lines is usually directly connected, without intervening electronic devices, to the bottom or top pixel electrodes in its associated row or column. Usually the pixels of such an array are driven sequentially in a scanning process in which each row is selected successively, and, during the selection of each row, each column is selected successively, causing each pixels of each row to be scanned in sequential order. During the time allotted for the selection of each pixel the circuitry decides whether that pixel is to be turned on or off by controlling the amplitude of the voltage applied across the pixel. In parallel scanned arrays each of the rows is selected in succession, and during the selection of each row all of the column lines are driven in parallel with individually selected voltages, turning each pixel in the row to a desired state, either "on" or "off". Such multiplexing scanning schemes in which the pixels are driven directly by their x and y address lines without intervening electronic devices work well for relatively small arrays. But as array size grows, the amount of time for the application of a voltage to a given pixel, or row of pixels, decreases. As a result, the percentage of time during each scanning cycle that a given pixel has a voltage applied across it decreases, thereby decreasing the average contrast between its "on" state and its "off" state. For this reason large multiplexed displays tend to produce images with poor contrast, making such displays difficult to read.

One way of overcoming this limitation to use active display matrixes instead of multiplexed displays. In active display matrixes each of the pixels has associated with it a non-linear electronic devices which acts as a switch. This switch enables current to flow to or from the pixel during the brief period when the pixel is selected, enabling it to rapidly change state from "off" to "on", or vice versa, but it tends to prevent current flow to or from the pixel when it is not selected, so the charge placed on the pixel during its brief selection period is substantially maintained during the rest of the scanning cycle. As a result, the pixel tends to maintain its "on" or its "off" state during the entire scanning cycle, greatly increasing the contrast and readability of the display.

One type of electronic device commonly used with the pixels of active display matrixes is the three terminal control device, such as the transistor. A three terminal control device is one that has two current path electrodes and a control electrode, with the effective resistance between the two current path electrodes being controlled as a function of a signal supplied to the control electrode. For example, in the thin film field effect transistors often used in active matrix displays, the voltage applied to the gate electrode controls the amount of current which flows between the source and the drain of the transistor.

The three terminal devices are usually arranged on one substrate of the display, with one of their current path electrodes connected to an electrode of their associated pixel. In the prior art, crossing x and y lines are also placed on the substrate to enable each three terminal device and its associated pixel to be individually addressed. One of the sets of the address lines, for example, the x lines, are connected to the control electrodes of the three terminal devices, with each x line being connected to each of the control electrodes in its associated row of pixels. Correspondingly, the other set of address lines, the y lines, are connected to one of the current path electrodes of the control devices, with each y line being connected to a current path electrode associated with each pixel in its column. All the pixel electrodes on the display's other substrate are usually connected to a common voltage, such as ground. A given pixel is selected by applying a proper voltage between the x line connected to the control electrode of its three terminal device and the y line connected to the current path electrode of its three terminal device. For example, when the three terminal devices are thin film field effect transistors, the source of each transistor is connected to a y line and the gate of each transistor is connected to an x line. In such a structure, a selected transistor is turned on or off by providing the desired voltages between the x line connected to its gate and the y line connected to its source.

SUMMARY OF THE INVENTION

Roughly speaking the present invention relates to a light influencing display having a plurality of pixels, each with a first electrode connected to a preselected voltage through a switchable deposited semiconductor control device and each with an opposing second electrode. The invention provides means for turning on each control device of a first selected group of the pixels, so the first electrode of each pixel in that group is connected to a preselected voltage. It also provides means for supplying a data voltage to each second electrode in a second selected group of the pixels. As a result, a pixel which belongs to both groups is addressed by having a selected voltage applied between its first and second electrodes.

More particularly, the present invention relates to a light influencing display which has a plurality of pixels, each including a first electrode formed on a first surface and an opposing, second electrode formed on a second surface. The plurality of pixels is divided into pixel groups, each consisting of a separate plurality of pixels. A separate three terminal control device is formed of deposited semiconductor material on the first surface in association with each pixel. Each of the control devices has two current path terminals and a control terminal which controls the conductivity between them. A first of each control devices' current path terminals is connected to the first electrode of its associated pixel. The display further includes a separate voltage supply lead formed on the first surface in association with each pixel group, with each such voltage supply lead being connected to the second current path terminal associated with its pixel group. A conductive control lead is also formed on the first surface in association with each pixel group, with each such control lead being connected to the control terminals associated with its pixel group. A plurality of conductive data leads is formed on the second surface, with a different data lead being electrically connected to each second electrode of a given pixel group, and with individual data leads being connected to at least one second pixel electrode in each of a plurality of pixel groups. As a result of this structure, a desired voltage can be applied between the electrodes of a given pixel by using a selected control lead to turn on the control device of that pixel's pixel group, and by using the data lead connected to the pixel to supply a selected data voltage to its second electrode.

In a preferred embodiment of the invention the first and second insulative surfaces are the surfaces of two opposing substrates formed of a material such as glass, and a light influencing display material, such as liquid crystal material, is placed between the first and second electrodes of each pixel. Preferably, the control devices associated with each pixel are transistors, such as thin film field effect transistors having channel regions formed of a deposited semiconductor material, such as an amorphous alloy of silicon, including hydrogen and/or fluorine as density of state reducing elements.

In some embodiments of the invention, each first pixel electrode has two separate three terminal control devices formed in association with it to provide redundancy, and at least one of the control devices has a laser blowable fuse connected to one or two of its electrodes so as to enable that control device to be removed from effective operation. Also in some embodiments of the invention, the voltage supply lead associated with one pixel group functions as a control lead associated with another pixel group.

In preferred embodiments of the invention, the pixels in each pixel group are arranged in a row and the voltage supply and control leads associated with each pixel row form two non-crossing parallel conductive lines extending in the direction of that row. In fact, it is preferred that the pixels are arranged in an x-y array so that each pixel belongs to both a pixel row and a pixel column. Preferably, the data lead is connected to the second pixel electrode of all the pixels in a given pixel column, so that by selectively supplying the proper voltage through a control lead associated with a selected pixel row and by supplying a voltage through a data lead connected to a selected pixel column, the pixel at the intersection of the selected row and column has a voltage applied across it.

In one alternate embodiment of the invention, each pixel row has associated with it one voltage supply lead and one control lead in addition to the voltage supply and control leads of any other pixel row, so that each additional row requires two additional conductive leads. In a different alternate embodiment of the invention, the voltage supply lead associated with one pixel row also functions as the control lead associated with an adjacent pixel row, so that each additional row only requires one additional conductive lead.

The present invention also relates to subassemblies for use in light influencing displays of the type described above. Such subassemblies comprise the elements formed on the first insulative surface in the embodiments of the invention described above.

The present invention also relates to the method of supplying a voltage to a selected pixel from among a plurality of pixels divided into groups. The method is applicable in cases in which each pixel has a first and a second electrode and has a separate three terminal control device of the type described above, with a first of the control device's current path terminals connected to the pixel's first electrode. The method of the present invention comprises supplying preselected voltages to the second current path terminals of the control devices associated with each pixel. The method further includes supplying a data voltage through a selected data lead to a second pixel electrode in each of the pixel groups, including the second pixel electrode of the pixel to be selected. It also includes supplying an "on" signal to each of the control terminals of the control devices associated with the pixel group including the selected pixel, so as to turn on the conductivity between the current path terminals of its control devices, thus effectively connecting the first electrode of the selected pixel to a given preselected voltage. The method also includes supplying an "off" signal to each of the control terminals of the control devices associated with other, non-selected, pixel groups, so as to turn off the conductivity between the current path terminals of their control devices. As a result, a selected voltage is applied across the selected pixel, but not across pixels in the non-selected pixel groups.

In a preferred embodiment of this method, a plurality of separately selectable data voltages are supplied in parallel through a plurality of data leads, with each selected voltage being supplied to one second pixel electrode in each pixel group. As a result, a plurality of pixels in the selected pixel group have a separately selected voltage applied between their first and second pixel electrodes at the same time.

According to a preferred embodiment of the method of the present invention, the pixels are arranged in an x-y array in which each pixel group forms a row in the array, and each pixel, besides being in a pixel row, is also in a pixel column. According to this method, the supplying of a voltage through a selected data lead includes supplying such a voltage through a data lead to each second electrode of each pixel belonging to a given pixel column.

According to another embodiment of the method of the present invention, a separate voltage supply lead is used to supply the preselected voltages to the second current path terminals associated with each pixel group. A separate control lead is used to supply the "on" and "off" signals to the control terminals associated with each pixel group. In one such embodiment, the same conductive lead which is used as the control lead to supply the "on" and "off" signals to the control terminals associated with one pixel group is also used at other times as the voltage supply lead to supply a certain preselected voltage to the second current path terminals associated with another pixel group when that other pixel group is the selected pixel group.

The method of the present invention has two alternate embodiments for use with liquid crystal displays for periodically reversing the polarity of the voltages supplied across the pixels of such displays, so as to reduce the deterioration of such pixels which would result from a prolonged net direct current flow across them. In the first alternate method the preselected voltage supplied to the second current path terminals associated with the selected pixel group is held constant and the polarity of the data voltages applied to the second pixel electrodes is periodically reversed. In the second alternate method, the preselected voltage supplied to the second current path terminals associated with the selected pixel groups is periodically changed between a more positive voltage and a more negative voltage. In this embodiment the data voltages supplied to the second pixel electrodes are substantially limited to voltages below the preselected voltage when the preselected voltage is at the more positive level, and are substantially limited to voltages above the preselected voltage when the preselected voltage is at the more negative level.

In one preferred embodiment of the present invention, the preselected voltages are supplied to the second current path terminals of all the pixel groups in common.

In a preferred embodiment of the invention, the control devices are thin film field effect transistors and the current path terminals are sources and drains of such transistors, and the control terminals are the gates of such transistors. In such an embodiment, the "on" signal supplied to the gate electrodes of the selected pixel group is a voltage sufficiently higher than the preselected voltage supplied to the source electrodes of the selected group so as to turn the transistors of the selected group "on". In such an embodiment, the "off" signal supplied to the gate electrodes associated with the non-selected pixel groups is sufficiently low to keep the transistors of those non-selected pixel groups "off". Preferably, this "off" signal is a voltage which is sufficiently low to keep the transistors of the non-selected pixel groups "off", even when the voltage on the first pixel electrode connected to the first current path terminals of those transistors is less than the preselected voltage supplied to the source electrodes of such transistors by twice the largest data voltage applied across the pixels.

DESCRIPTION OF THE DRAWINGS

In the drawings, which form an integral part of the specification of the present application and which are to be read in conjunction therewith, and in which like reference numerals are employed to designate similar components in various views:

FIG. 10 is a representational partial top plan view of a single substrate subassembly for use in a light influencing display according to one embodiment of the present invention, which is similar to that shown in FIG. 1 except that the gate and source lines connected between adjacent rows of pixels are combined;

FIG. 11 is a schematic circuit diagram of the light influencing display produced when a top substrate, such as that shown in FIG. 2 is combined with the bottom substrate shown in FIG. 10;

DESCRIPTION OF THE PREFERRED EMBODIMENTS

Figure 1:
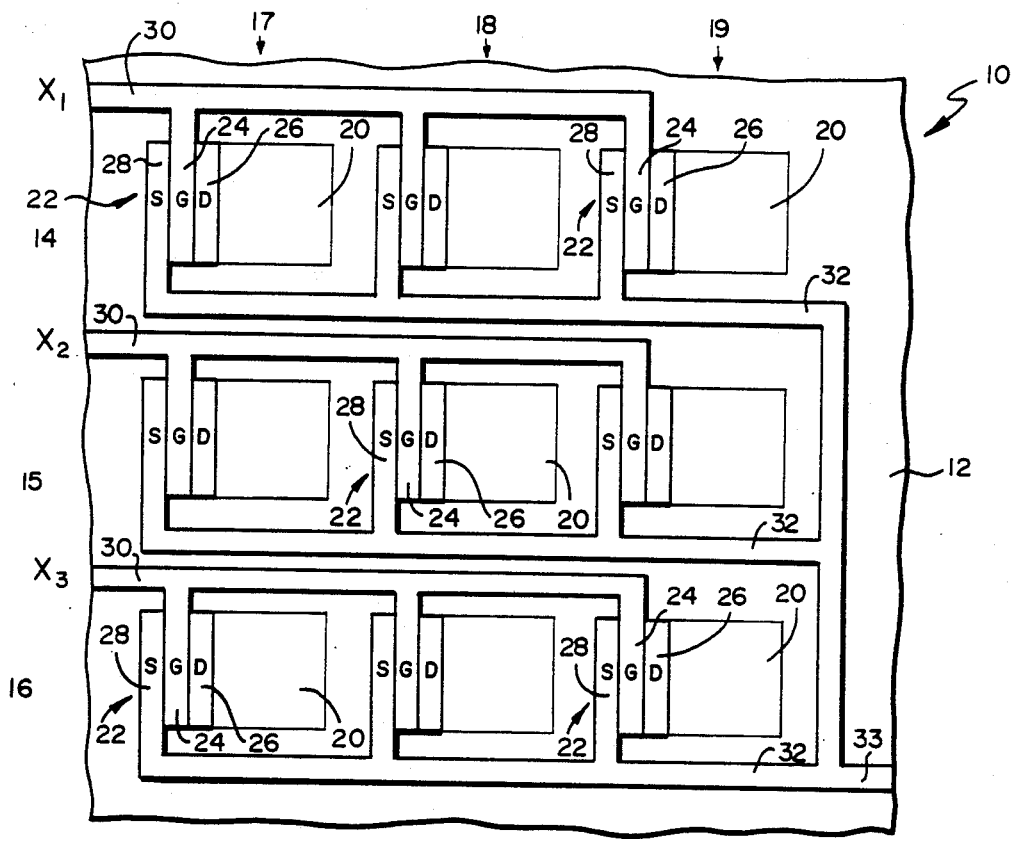
FIG. 1 is a representational partial top plan view of a single substrate subassembly for a light influencing display according to one embodiment of the present invention.

Referring now to FIG. 1, a portion of a single substrate subassembly for use in a light influencing display embodying the present invention is shown. The subassembly 10 includes substrate 12 which has an insulative surface and a plurality of pixel rows 14, 15 and 16 formed on the surface of that substrate. Each of the rows 14, 15 and 16 has a plurality of first pixel electrodes 20 formed on the substrate surface. These first pixel electrodes are arranged in an x-y matrix with the electrodes 20 being aligned in pixel columns 17, 18, and 19 as well as the pixel rows 14, 15, and 16. For purposes of simplification the x-y array shown in the drawings of the present application is a 3×3 matrix. It should be understood, however, that in most embodiments of the present invention much larger arrays of pixels will be used, such as, for example, an array of 640 columns by 400 rows of picture element.

Each of the first pixel electrodes 20 has associated with it a separate three terminal control device 22, each of which has a control terminal 24 and two current path terminals. The two current path terminals include a first current path terminal 26 and a second current path terminal 28. In the preferred embodiment shown, the three terminal control devices 22 are thin film field effect transistors, with the control terminals 24 being gate electrodes, the first current path terminals 26 being drain electrodes and the second current path terminals 28 being source electrodes. In this specification, for purposes of simplicity, the electrodes 26 are always called the drains, and the electrodes 28 are always called the sources, of the transistors 22, regardless of the direction of current flow through the transistors. The structure of the transistors 22 is shown in a simplified representational form in FIG. 1, but is shown in considerably more detail in FIG. 4 explained below.

The subassembly 10 includes a conductive control lead 30 formed on the surface of substrate 12 and connected to the control terminal of each of the control devices associated with each pixel row 14, 15, and 16. In the figures, the control leads 30 associated with the rows 14, 15 and 16 are labeled X1, X2 and X3, respectively. The subassembly 10 further includes a separate conductive voltage supply lead 32 associated with each pixel row. The voltage supply leads 32 are electrically separate from the control leads 30. Each of the voltage supply leads are formed on the surface of substrate 12 and are connected to the second current path terminal 28 of each of the control devices of its associated pixel row. The leads 30 and 32 associated with each pixel row extend parallel to each other in the direction of that row. Even though the voltage supply leads 32 are electrically connected to a common conductive lead 33, they are considered separate for purposes of circuit layout because each of them extends along a different row.

Figure 2:
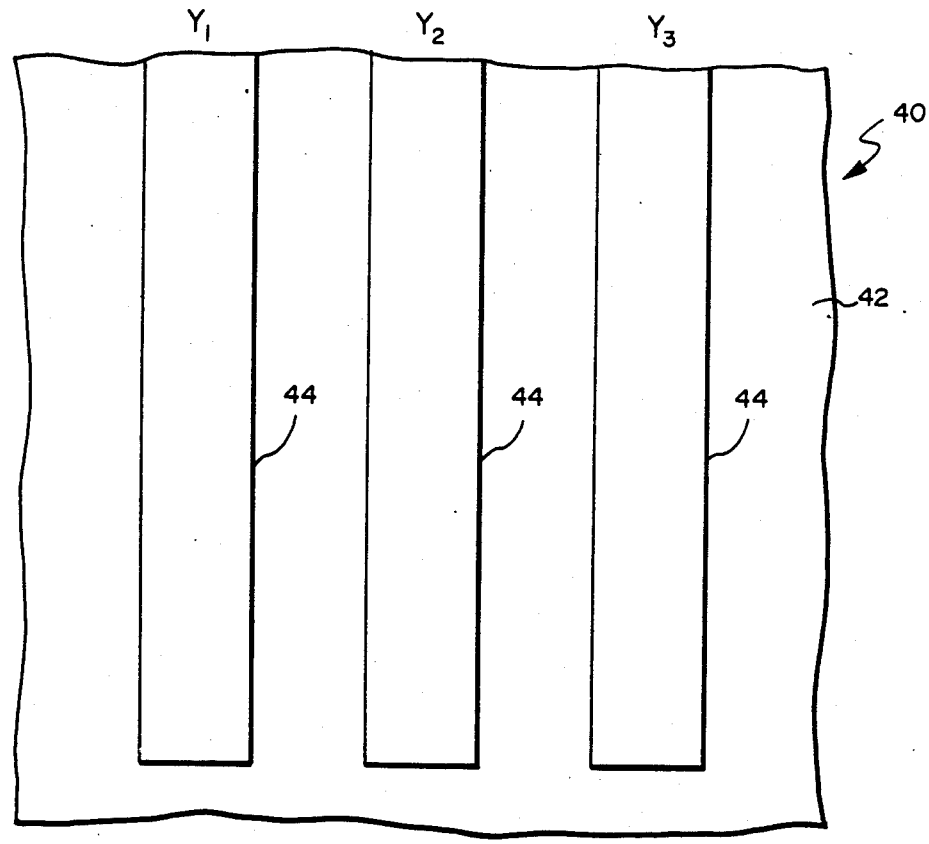
FIG. 2 is a representational partial top plan view of a second substrate for use in conjunction with the first substrate shown in FIG. 1 for constructing a light influencing display according to one embodiment of the invention.
Figure 3:
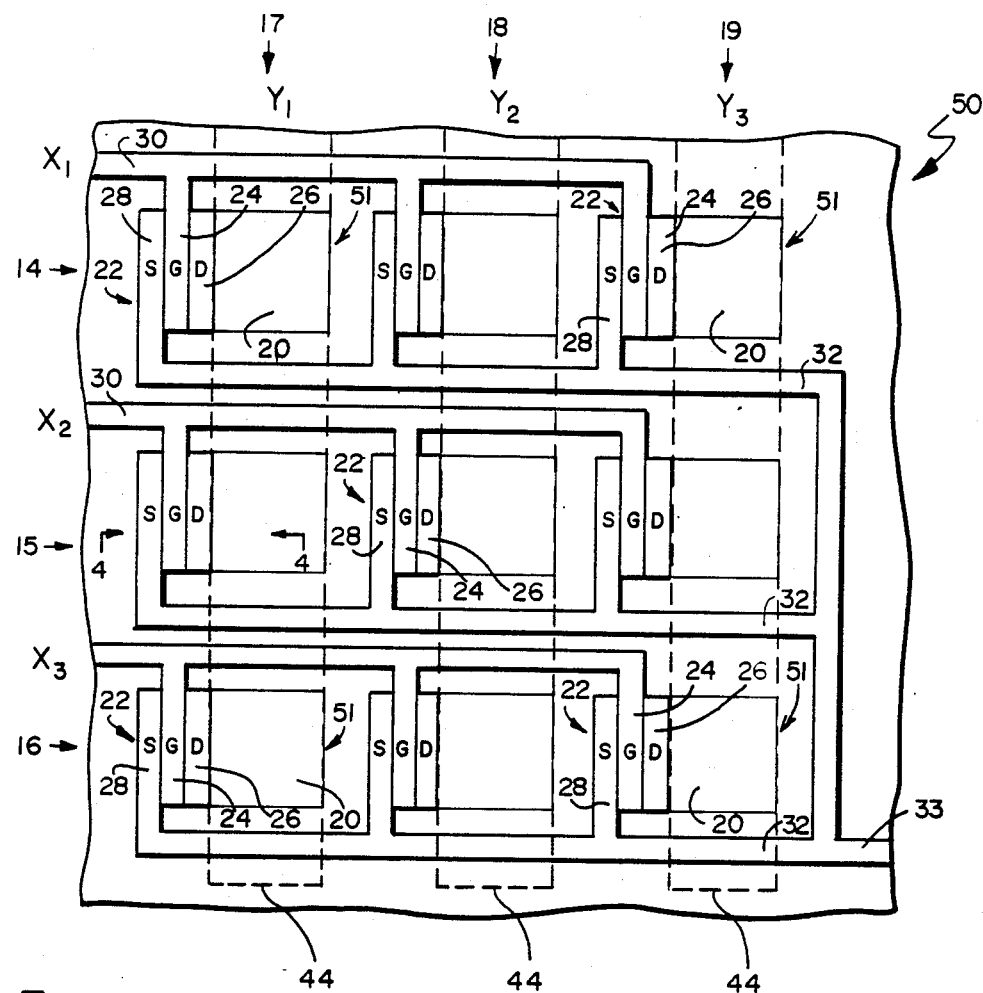
FIG. 3 is a representational partial top plan view of a light influencing display formed by placing the substrate shown in FIG. 2 on top of the substrate shown in FIG. 1, with the combination column address and pixel electrode lines Y1, Y2 and Y3 of the second substrate shown in dotted lines.
Figure 4:
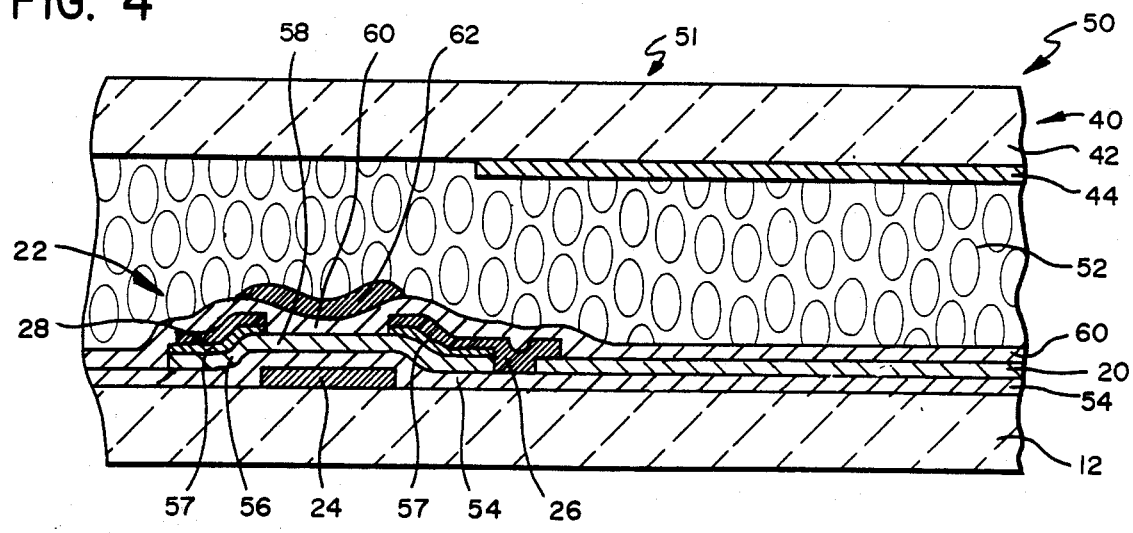
FIG. 4 is a partial cross-sectional side view of the light influencing display shown in FIG. 3, taken along the lines 4—4 shown in FIG. 3.

Referring now to FIG. 2, a second substrate assembly 40 is shown. This second assembly is designed for use in conjunction with the subassembly 10 shown in FIG. 1 to form a light influencing display as shown in FIGS. 3 and 4. The second substrate assembly 40 comprises a substrate 42 having an insulative surface upon which electrically separate columns of pixel electrodes are formed.

When a display to be formed according to the present invention is to be back-lighted, both substrates 12 and 42 should be made of a transparent material such as glass. When, however, a display according to the present invention is intended to operate in the reflective mode, one of the two substrates can be made out of an opaque material. In the embodiment shown in the Figures, the displays are designed to be operated in the back-lighted mode, and both substrates 12 and 42 are made of glass. In such an embodiment, the substrate assembly 40 includes a plurality of transparent conductive strips 44 formed on its lower surface. Such transparent conductive strips can be formed by photolithographic means of a transparent conductive oxide such as indium tin oxide. In such a back lighted embodiment the pixel electrodes 20, formed on the first substrate 10, are also formed by photolithographic means out of a transparent conductive oxide such as indium tin oxide, and the conductive leads 30, 32 and 33, and the transistor gate, source and drain electrodes of that substrate are formed by photolithographic means out of conductive metal.

Referring now to FIGS. 3 and 4, a light influencing display 50 according to one embodiment of the present invention is assembled by placing the second substrate assembly 40 over the first substrate assembly 10 so that the conductive strips 44 (which are shown in dotted lines in FIG. 3) overlie the pixel electrodes 20. The upper substrate assembly 40 is positioned so that the conductive strips $Y_1$, $Y_2$ and $Y_3$ overlie the bottom pixel electrodes 20 associated with the pixel columns 17, 18 and 19, respectively. The portion of each conductive strip which opposes a given bottom pixel electrode 20 is spaced from, and is substantially parallel to, that bottom electrode 20, and forms an upper, or second, electrode surface in opposition to that given bottom electrode. The conductive strips 44 not only act as second pixel electrodes, but they also each act as conductive data leads for supplying voltages to the pixel electrode surfaces they include.

Referring now to FIG. 4, before the assembly of the light influencing display 50 is complete, a thin layer of light influencing material 52 is placed between its two substrates 12 and 42. As is well known in the art of flat panel displays, when a voltage is applied between a bottom electrode 20 on the substrate 12 and its opposing top electrode formed by the conductive strip 44 on the upper substrate 42, that voltage changes the optical properties of the light influencing material 52 located between those two electrodes. This combination of a bottom pixel electrode 20, the portion of the conductive strip 44 which opposes it, and the light influencing material in between forms a pixel 51. In the embodiment shown, the light influencing material 52 is a liquid crystal material. The application of a voltage between the electrodes of a given pixel changes the orientation of the liquid crystal molecules between those electrodes, changing the effect of the liquid crystal material upon light passing through it. As is well known in the art of flat panel displays, many types of liquid crystal displays require polarizing and alignment layers in association with their pixels. Such polarizing and alignment layers have not been shown in FIG. 4 for purposes of simplification since the nature of such layers is well known in the art of liquid crystal displays.

FIG. 4 shows a cross sectional view of a thin film field effect transistor 22 formed upon the substrate 12. Thin film field effect transistors can be formed in a variety of methods which are known in the art of thin film transistors. The embodiment of the invention shown in FIG. 4 includes a transistor 22, in which a gate electrode 24 is formed upon the insulative substrate 12 by photolithographic means. Also formed in the same photolithographic step is the x line 30 to which each gate electrode is connected. The gate electrode and its connected x line are formed from an opaque metal, such as chromium, which is preferably 0.1 micron to 0.3 microns thick. After the metal layer containing the gate electrodes 24 and the x lines 30 has been deposited and patterned, a gate insulating layer 54 is deposited over the substrate 12. The gate insulator 54 has a thickness preferably from about 0.1 micron to about 0.3 microns and is formed, for example, from a material such as silicon oxide ($SiO_x$), silicon nitride ($Si_xN_y$), or silioxynitride ($SiO_xN_y$.)

After the gate insulating layer 54 has been formed, a layer of indium tin oxide is deposited over the substrate 12 and is patterned to form a bottom pixel electrode 20 next to the site of each transistor 22.

Next a layer of semiconductor material is deposited. This layer is patterned by photolithographic techniques to cover the gate electrode 24 as well as an area on each side of that gate over which the source and drain electrodes will subsequently be deposited. Preferably this deposited semiconductor material is formed of a relatively intrinsic amorphous silicon alloy containing hydrogen and/or fluorine as density of state reducing elements. By the term "amorphous" is meant an alloy or material which has long-range disorder, although it may have short or intermediate order or even contain at times some crystalline inclusions. Such materials can include, for example, microcrystalline or polycrystalline semiconductor material.

The layer 56 of semiconductor material can be formed by the plasma assisted chemical vapor deposition of silane plus hydrogen, silicon tetrafluoride and silane, or of silicon tetrafluoride and hydrogen, as disclosed, for example, is U.S. Pat. No. 4,226,898 which issued on Oct. 7, 1980 in the names of Stanford R. Ovshinsky and Arun Madan for "Amorphous Semiconductors Equivalent To Crystalline Semiconductors Produced By A Glow Discharge Process" which patent is incorporated herein by reference. The semiconductor layer can have a thickness from about 0.05 to about 1 micron, and preferably from about 0.1 to about 0.3 microns.

In alternate embodiments of the invention, the deposited semiconductor material includes other materials, such as germanium or cadmium selenide.

The top 300 to 500 angstroms of layer 56 is formed of an N+ doped sublayer 57. This surface sublayer 57 can be formed by introducing phosphine gas into the deposition chamber during the end of the deposition of layer 56. Such a gas introduces phosphorus doping atoms into the top portion of layer 56. This N+ sublayer 57 causes the semiconductor material of layer 56 to form a much better ohmic contact with the metal of the source and drain contacts which are formed on top of it.

After the layer 56 has been deposited and patterned, a layer of metal, preferably between 0.1 and 0.3 microns thick, is deposited over substrate 12. The metal of this layer is chosen to form a good ohmic contact with the N+ material of sublayer 57. For example, metals such as molybdenum, aluminum, chromium or molybdenum tantallium alloy all form good ohmic contacts with the N+ material of sublayer 57.

The metal layer is then patterned by photolithographic means to form separate source and drain electrode 28 and 26 for each transistor 22. Also formed during this patterning step are the metal voltage supply leads 32 which are connected to the sources 28. The drain 26 is patterned to overlie a small portion of the bottom pixel electrode 20 so as to make electrical contact with that electrode, and the source 28 and drain 26 are both patterned so that there is a gap between them directly over the gate 24. After the source and drain have been patterned, they are used as masks in an etching process which etches away the top N+ sublayer 57 located in the gap between them. This is done to prevent the relatively high conductivity of the N+ sublayer from short circuiting the field effect transistor channel 58 formed in layer 56 between the source and drain.

After the source 28 and drain 26 have been formed and the portion of the N+ sublayer between them has been etched away, an electrically insulative passivation layer 60, formed of material, such as silicon nitride, silicon dioxide, or polyimide, is coated over the entire bottom substrate. The layer 60 protects the electrodes of transistor 22 and the bottom pixel electrodes 20 from electrolysis with the liquid crystal material of the display in which they are used. In addition, since it provides an insulator between the bottom pixel electrode 20 and the top electrode surfaces formed by the strip conductors 44, the layer 60 substantially reduces electrolytic current flow between those top and bottom electrode surfaces, thus greatly reducing the deterioration of the electrode surfaces on the top substrate as well as those on the bottom substrate. It should also be noted that in displays in which alignment layers (not shown in the Figures) are placed over the top and bottom electrode surfaces, such alignment layers also provide the electrode surfaces with protection from electrolysis.

A light blocking layer 62 formed of metal approximately 0.1 micron thick is deposited over the substrate and is patterned to cover, and prevent light from hitting, the semiconductor material 56. This light blocking layer is used because amorphous alloys of silicon are photoconductive and thus the transistor 22 would have its operating characteristics altered unless ambient light was blocked from hitting its semiconductor material by such a light blocking layer. The capacitance between the electrodes of transistor 22 and the metal light blocking layer 62 can be decreased by increasing the thickness of the passivation layer 60 or by reducing the overlap between the light blocking layer 62 and the source 28 and drain 26. This capacitance problem can be avoided all together by forming the insulative passivation layer 60 of a light blocking material. In some embodiments of the invention however, it might actually be desired to have some capacitance between the source and drain electrodes of the transistors 22. Such capacitance might be desired to partially compensate for the capacitance between the gate and the drain of such transistors. In such embodiments the metal of the light blocking layer 62 can be used to capacitively couple the source and drain by having that layer patterned to overlap each of those two electrodes.

The transistor 22 operates in the normal manner of an N channel enhancement mode thin film TFT. That is, when a voltage which is sufficiently positive relative to the lowest voltage placed on either its source or its drain electrode is applied to its gate electrode, a conductive channel is formed in the portion of the semiconductor layer 56 between its source and drain, greatly increasing the conductivity between those electrodes. In the absence of such a positive gate voltage, the low conductivity of the relatively intrinsic amorphous silicon alloy of layer 56 makes the circuit path between the source and drain have a very high resistance, substantially electrically isolating those two electrodes.

Figure 5:
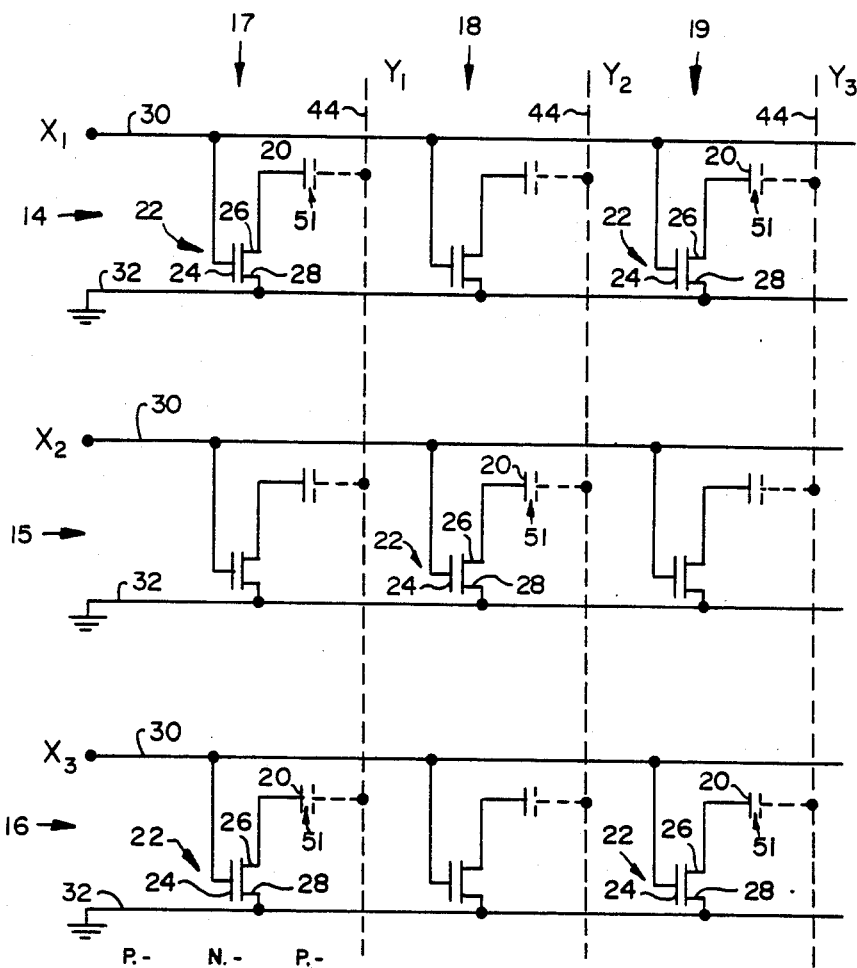
FIG. 5 is an electrical schematic diagram of the electrical circuitry formed by the embodiment of the invention shown in FIG. 3.

Referring now to FIG. 5, a schematic diagram of the 3×3 pixel array of FIG. 3 is shown. The circuit elements formed on the bottom substrate 12 are shown in solid lines in FIG. 5 and the circuit elements formed by the strip conductors 44 on the upper substrate 42 are shown in dotted lines. Each of the pixels 51 formed by a bottom electrode 20 and a portion of the strip conductor 44 has associated with it a capacitance, as indicated in FIG. 5. The sources of all of the transistors 22 are connected to ground through the second conductive leads 32.

Figure 6:
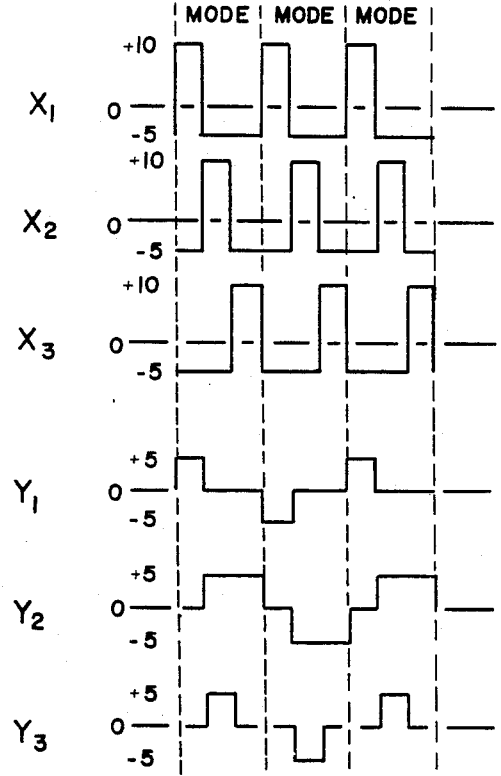
FIG. 6 is a set of wave diagrams showing the voltages supplied to the X and Y lines of the embodiment of the invention shown in FIGS. 3 and 5.
Figure 7:
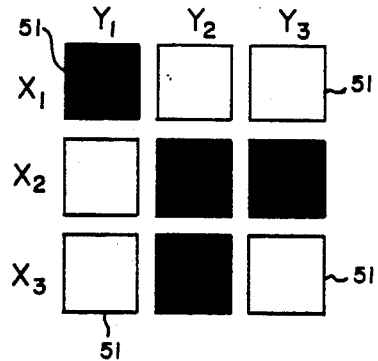
FIG. 7 is a schematic representation of the distribution of "on" and "off" pixels which result when the embodiment of the invention shown in FIGS. 3 and 5 is supplied with the wave forms shown in FIG. 6.

FIG. 6 shwns the voltage waveforms applied to the circuit shown in FIG. 5 to cause its pixels to form the pattern shown in FIG. 7. In the embodiment shown, the pixels 51 are light transmissive unless a voltage is applied across them, in which case they become light blocking or dark. The waveforms $X_1$, $X_2$, and $X_3$ are voltage waveforms which are supplied through the control leads 30 to the gates 24 of the transistors in the row 14, 15 or 16, respectively. Similarly the waveforms $Y_1$, $Y_2$ and $Y_3$ are voltages applied through the strip conductors 44, which function as data leads, to the pixels 51 in the columns 17, 18 and 19, respectively, and through the capacitive couplings of those pixels to the drains 26 of their associated transistors 22. The source electrodes of all the transistors 22 are connected through the voltage supply leads 32 to ground.

In operation, each of the transistors 22 in a given row 14, 15, or 16 is turned on when its respective X line 30 is supplied with a positive "on" gate voltage, which for the TFTs of the preferred embodiment is approximately 10 volts. Once the transistors 22 of a given row are turned on, the conductivity between the sources 28 and drains 26 of that row is greatly increased, effectively connecting the bottom pixel electrodes 20 of that row to ground. When a given row is selected in such a manner, a plurality of selected data voltages are applied in parallel to the second pixel electrodes of the row by means of the data leads, or Y lines, formed by the conductive strips 44. This causes each of the pixels 51 in the selected row to be charged to a voltage equal to the difference between the data voltage on its associated Y line and the ground voltage on its source line 32. For example, during the first third of each p-mode, when the address line $X_1$ is high, the Y address line $Y_1$ is supplied with an "on" data voltage of approximately +5 volts, and the Y address lines $Y_2$ and $Y_3$ are supplied with "off" data voltages of zero volts. As a result, the left pixel of the top row is turned on, whereas the remaining two pixels of that row remain off. In the embodiments of the invention described in FIG. 7 and the rest of this specification, the pixels which are turned on are made opaque or dark, and the pixels which are left off remain transparent or light. It is to be understood, however, that the present invention is also applicable to displays which behave just the opposite, that is, in which pixels that have a voltage applied across them turn transparent and those without a voltage applied across them remain opaque.

During the period when the first row is selected and has its transistors turned on, the address lines $X_2$ and $X_3$, which are connected to the other non-selected pixel rows, are supplied with a negative potential of −5 volts. This negative potential extends below ground by −5 volts and insures that each of the transistors in non-selected rows remain off. In fact this voltage is sufficiently low to insure that the transistors in the non-selected rows remain off, even when the voltage on their associated bottom pixels 20, which are connected to their drains 26, is less than ground by twice the "on" pixel voltage of 5 volts. This is necessary for the following reason. If a given pixel is charged to +5 volts when its row is selected by placing its bottom pixel electrode 20 at ground and its Y line at +5 volts, this charge causes its bottom pixel electrode to remain 5 volts below the voltage on its Y line for as long as that 5 volt charge remains on the pixel. Since the leakage of charge across the pixel through the liquid crystal material, is relatively small during the period between the pixel's recharging, and since the transistor associated with the pixel is supposed to be turned off when its row is non-selected, a substantial portion of the +5 volt charge remains on the pixel during the period when it is non-selected. Thus, if the Y line drops to zero volts during the selection of another row, the voltaqe on the pixel's bottom electrode 20 drop to approximately −5 volts. Even more extreme, if during the n-mode, described below, the Y line drops to a minus "on" pixel voltage of −5 volts, its bottom pixel electrode will drop to approximately −10 volts. Because this large negative voltage is connected to their drain, the transistors in non-selected rows should be supplied with a negative gate voltage to insure that they remain off. Since the gate threshold voltage of the transistors of the preferred embodiment is more than 5 volts, the "off" gate voltage of −5 volts is sufficient to keep the non-selected transistors off even when the voltage on their drains, reached −10 volts.

In the second third of each p-mode period, the second X line, $X_2$ is supplied with a positive, or "on", gate voltage and all the other X lines are supplied with an "off" gate voltage of −5 volts. As shown in FIG. 6, during this period the line $Y_1$ is held at zero volts and the lines $Y_2$ and $Y_3$ are supplied with "on" voltages of +5 volts. Thus, as is shown in FIG. 7, the first pixel in the row $X_2$ remains off, and thus transparent, whereas the second and third pixels in that row are turned on, and thus are light blocking. Similarly, during the last third of the p-modes the last row $X_3$ has a positive "on" gate voltage supplied to its transistors, and the other rows have negative or "off" gate voltages supplied to their transistors. During this time, the line $Y_1$ is supplied with a zero "off" voltage, the line $Y_2$ is supplied with a positive "on" voltage and line $Y_3$ is supplied with a zero "off" voltage. Thus, the first and third transistors of that row remain off, and only the middle transistor of that row is turned on.

As is well known in the art of liquid crystal displays, it is important to periodically reverse the polarity of the voltages applied across individual pixels. This is because a prolonged net dc current flow damages such pixels. For this reason the voltage driving scheme used to power the display shown schematically in FIG. 5 is divided into alternating positive and negative modes, indicated by the labels p-mode and n-mode in FIG. 6. In this driving scheme the voltages applied through the X lines, $X_1$, $X_2$ and $X_3$ to the gates of the transistors 22 are the same during both the p and n modes. However, the polarity of the voltages applied to the Y lines, $Y_1$, $Y_2$ and $Y_3$ during the n-mode are reversed in polarity relative to those applied during the p-mode. Thus the voltages supplied to the X lines turn on the transistors of the display in the same manner during both the p-and n-modes, but during the n-mode the pixels 51 which are to be turned on are supplied with a negative "on" voltage of −5 volts, rather than a positive "on" voltage of +5 volts.

In a typical embodiment of the invention, the device alternates between the p-and n-modes at 60 times a second, the rate used to alternate between fields of a standard video signal. As a result, a pixel which is turned on has the polarity of the voltage applied across it rapidly varied, preventing any net dc current flow through the liquid crystal material associated with that pixel. Furthermore, since the entire pixel array has each of its pixels rewritten 60 times a second, there is no perceived flicker on the display.

Figure 8:
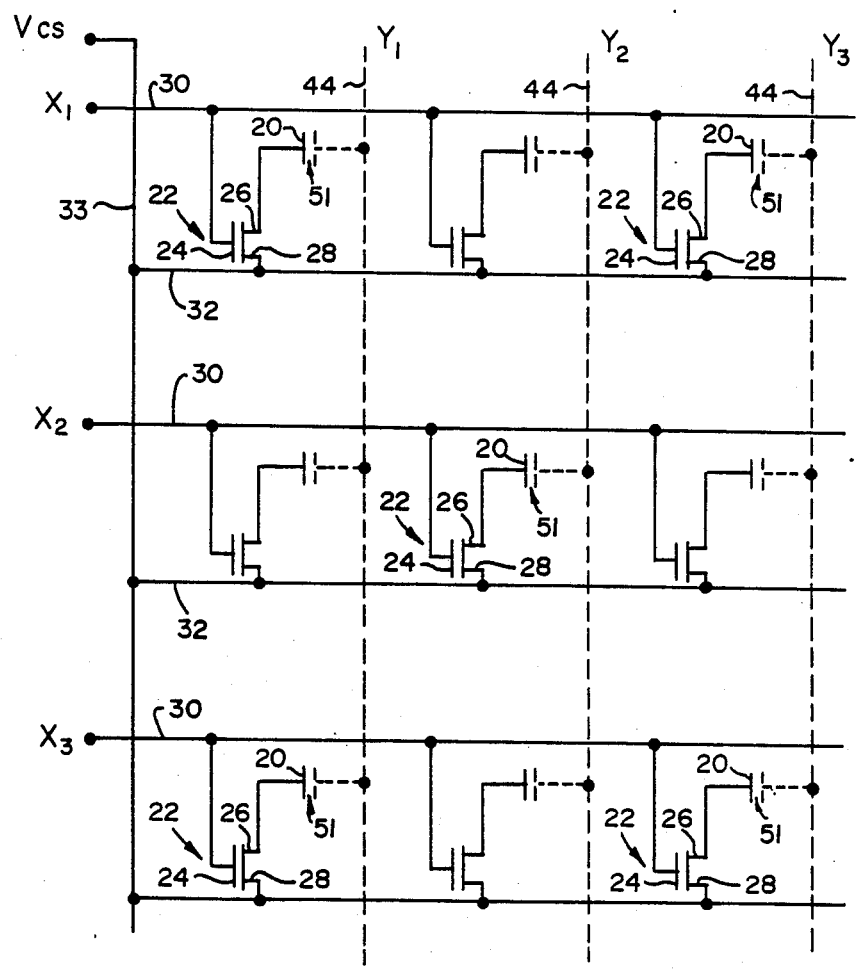
FIG. 8 is a schematic circuit diagram identical to that shown in FIG. 5 except that all the sources of its transistors, instead of being tied to ground as in FIG. 5, are tied to a common variable voltage source $V_{cs}$.
Figure 9:
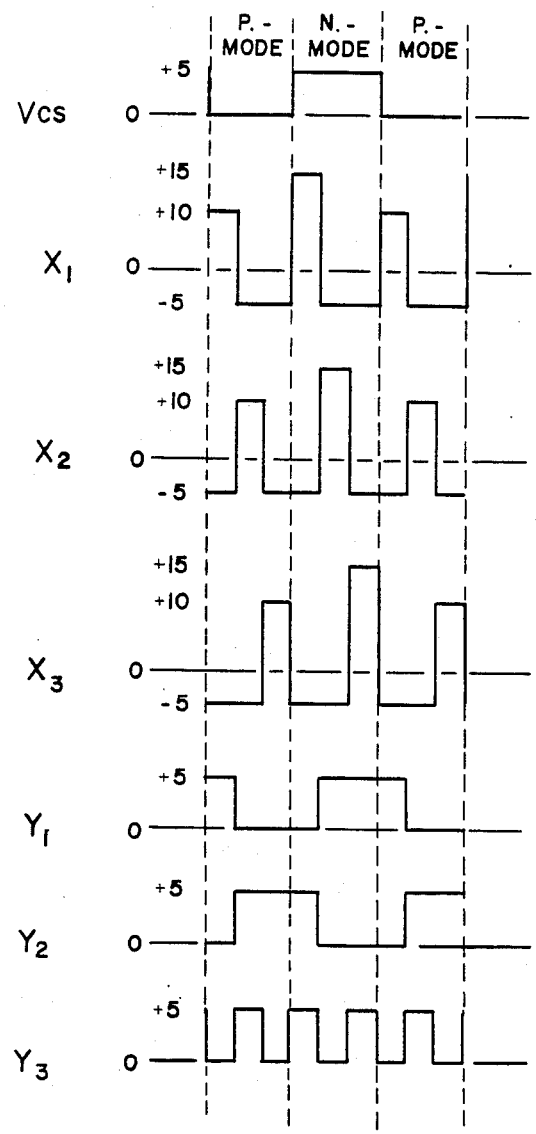
FIG. 9 is a set of wave diagrams showing the voltages supplied by the voltage supply $V_{cs}$ and to the x and y lines in FIG. 8 to produce the pixel pattern shown in FIG. 7.

Referring now to FIG. 8, a schematic diagram is shown of an alternate embodiment of the invention. This embodiment is identical to that shown in FIG. 5, except that the sources 28 of all of its transistors are connected through its voltage supply lines 32 and the common conductive lead 33 shown in FIGS. 1 and 3 to a variable preselected voltage supplied by a common voltage supply $V_{cs}$. FIG. 9 shows the voltage waveforms used to drive the circuitry of FIG. 8 to produce the pixel pattern shown in FIG. 7. As is shown in FIG. 9, the output of the common voltage supply $V_{cs}$, which is connected to the sources of all the transistors 22, is repeatedly alternated between two voltages, a more negative voltage and a more positive voltage. The output of $V_{cs}$ is held to a more negative ground voltage during each p-mode and it is held to a more positive voltage of $+5$ volts during each n-mode.

During the p-mode the apparatus shown in FIG. 8 and the waveforms shown in FIG. 9 operate identically to the apparatus shown in FIG. 5 and the waveforms shown in FIG. 6. It is in the n-mode that the voltage driving scheme shown in FIG. 9 differs from that shown in FIG. 6. As described above, the voltage driving scheme shown in FIG. 6 reverses the voltage polarity across its pixels by simply switching the polarity of the "on" data voltages supplied to its Y lines from a $+5$ volts during its p-mode to a $-5$ volts during its n-mode. In the voltage driving scheme shown in FIG. 9, on the other hand, the change in polarity across the pixels 51 is accomplished by both (a.) a change in the common voltage supply $V_{cs}$ from the more negative ground voltage to the more positive voltage of $+5$ volts and (b.) a reversal of the "on" and "off" data voltages supplied to the Y data lead lines 44, changing the "on" data voltage from $+5$ volts to ground and changing the "off" data voltage from ground to $+5$ volts. During the n-mode, when the sources of all of the transistors 22 are supplied with the more positive voltage of $+5$ volts, the Y lines 44 discharge, or turn off, pixels in selected rows by supplying their upper electrode with $+5$ volts, and they charge those pixels to a negative "on" voltage by supplying their upper electrodes with zero volts, which is 5 volts less than the voltage supplied to the bottom pixel electrodes in a selected row.

During the n-mode, the gate voltage supplied on the lines $X_1$, $X_2$ and $X_3$ to turn on the transistors of a selected row is $+15$ volts, which is slightly higher than the $+10$ volts used for this purpose during the p-mode. This is merely to insure that during the n-mode, when the sources 28 of the transistors in a selected row are supplied with $+5$ volts, that the voltage supplied to the gate 24 of those transistors is sufficiently higher than that source voltage to keep the selected transistors fully on.

Referring now to FIGS. 10 and 11 an alternate embodiment of the invention is shown. FIG. 10 is a partial top plan view of a bottom substrate subassembly similar to that shown in FIG. 1, except that in FIG. 10, the voltage supply and control leads located between the pixel rows 14, 15 and 16 are combined into one common conductive lead 72. This greatly simplifies the wiring associated with an x-y pixel array, reducing almost in half the number of address lines required on the bottom substrate subassembly in large x-y arrays. As is shown in FIGS. 10 and 11, the top X line 72 is labeled $X_{G1}$ indicating that it is connected to the gates of the first row of pixels. The second X line 72 is labeled $X_{S1\text{-}G2}$, indicating that it is connected to both the sources of the first pixel row and the gates of the second pixel row. Similarly, the third X line 72 shown in those figures is labeled $X_{S2\text{-}G3}$, indicating that it is connected to both the sources of the second pixel rows and the gates of the third pixel row. Finally, the bottom most X line 72 is labeled $X_{S3}$ indicating that it is connected to the sources of the third pixel row.

The bottom substrate subassembly shown in FIG. 10 is combined with a top substrate assembly such as that shown in FIG. 2 in a manner similar to that shown in FIGS. 3 and 4. When this is done, the resultant light influencing display has a circuit diagram similar to that shown in FIG. 11, in which each of the bottom pixel electrodes 20 on the bottom substrate subassembly forms a light influencing pixel 51 in conjunction with its associated transparent Y conductive strip 44. The display shown in FIG. 11 is identical to that shown in FIG. 5 except that the control and voltage supply lines between its pixel rows have been combined, as described above.

Figure 12:
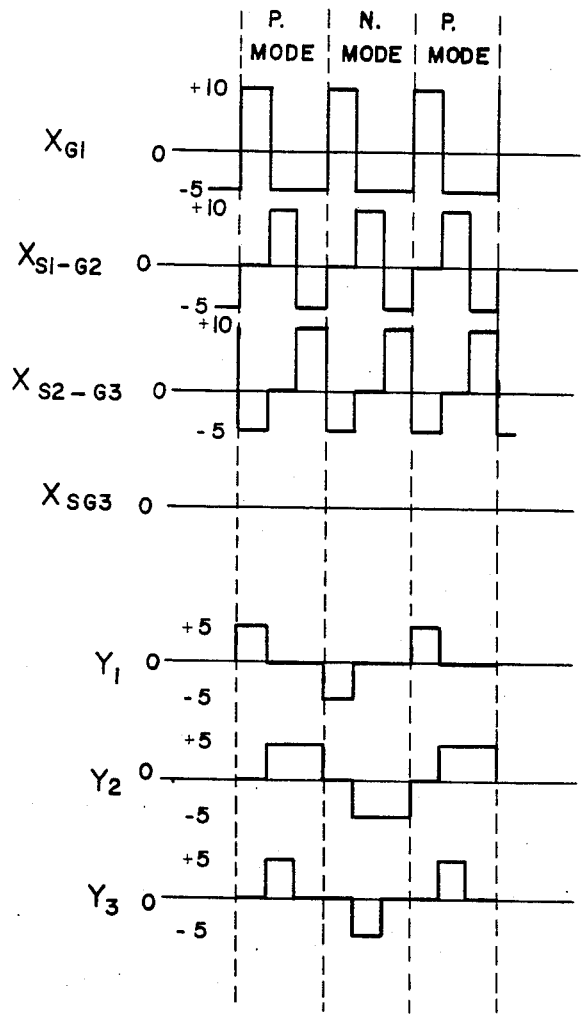
FIG. 12 is a set of wave diagrams showing the signals supplied to the x lines and y lines of the circuit shown in FIG. 11 in order to produce the pixel pattern shown in FIG. 7.

FIG. 12 describes the voltage waveforms which are supplied to the X lines 72 and the Y lines 44 shown in FIG. 11 in order to make its 3×3 matrix have the pattern shown in FIG. 7. The voltages supplied to the Y lines shown in FIG. 12 are identical to those supplied to the Y lines shown in FIG. 6. Similarly the voltage supplied to the X line $X_{G1}$ in FIG. 12 is identical to that supplied to the X line $X_1$ in FIG. 6. This is because the X line $X_{G1}$, being connected only to the gates of transistors in the row below it, functions just like the line $X_1$ in FIG. 6. The voltages supplied to the lines $X_{S1\text{-}G2}$ and $X_{S2\text{-}G3}$, however, are slightly different than those supplied to the lines $X_2$ and $X_3$ in FIG. 6, because the lines $X_{S1\text{-}G2}$ and $X_{S2\text{-}G3}$ act both to supply gate voltages to the row below them and to supply source voltages to the row above them. These lines are capable of performing both functions because these functions occur at different times.

During most of each scanning cycle, the connection of each of these combined source-gate lines to the sources of the transistors in the row above it is without consequence, because those transistors are turned off, effectively isolating their drains and associated bottom pixel electrodes from their sources. It is only during the brief period when the transistors in the row immediately above such a line are selected by the application of "on" gate voltages that the connection of such a combined source-gate line to the sources of the transistors in that row is of significance. During this period a zero or ground voltage is supplied to the combined source-gate line so that a ground voltage is supplied through the selected transistors to their associated bottom pixel electrodes, enabling each pixel in the selected row to charge up to the voltage supplied on its associated Y line.

During the rest of the time, when other pixel rows are selected, the combined source-gate line acts only as a gate voltage supplying line, and the voltages supplied to it are identical to those supplied to the corresponding X lines in FIG. 6. When the pixel row directly below a combined source-gate line is selected, that line is supplied with an "on" gate voltage of +10 volts to turn on the transistors of the selected row. During periods in which neither the pixel row directly above nor directly below a given source-gate line is selected, the voltage supplied to that given line is held to a −5 volts to insure that the non-selected transistors in the row directly beneath it remain off.

During the brief period when a source-gate line supplies a ground source voltage to the transistors in the selected row directly above it, it also supplies a ground gate voltage to the transistors in the non-selected row immediately below it. This undesirably high gate voltage for a non-selected row has the effect of enabling transistors in the row immediately beneath the source-gate line to discharge when the bottom pixel electrodes 20 connected to the drains of such transistors are driven to a large negative voltage, such as −10 volts, as described above in the explanation of why a −5 volt gate voltage is normally supplied to the transistors of non-selected rows. However, this brief period in which non-selected rows receive a slightly higher than desired gate voltage has a relatively small effect on the RMS voltage applied to each pixel over each scanning cycle. Such a zero volt gate voltage is only applied to a given non-selected row during the brief period in which the row directly above it is selected. In a large display in which there are many lines, this possible loss of a pixel's charge only one line interval before it is to be rewritten is of little concern.

The voltage supplied to the line $X_{S3}$ is held at ground. This is because this line functions only to supply voltage to the sources of the transistors in the pixel row immediately above it, and thus it is free to remain at ground at all times.

Figure 13:
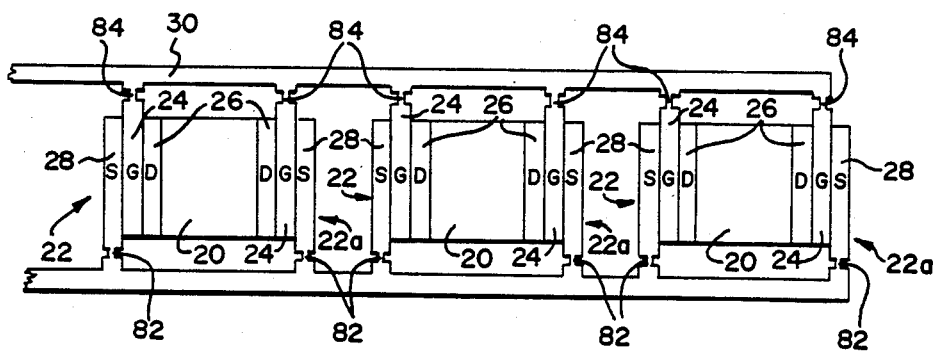
FIG. 13 is a partial top plan view showing the layout of a single row of pixel electrodes and their associated transistors and gate and source voltage supply lines according to an alternate embodiment of the invention in which each pixel has associated with it two thin film field effect transistors, each of which has laser blowable fuse links which can be blown to remove its associated transistor from operation.

Referring now to FIG. 13, an alternate embodiment of the invention is shown. This Figure shows a partial top plan view of a row of bottom pixel electrodes 20, with their associate gate voltage and source voltage supplying lines 30 and 32. This embodiment of the invention is substantially similar to that shown in FIG. 1 except that there are two transistors 22 and 22a associated with each bottom pixel electrode 20. The additional transistor 22a is constructed in the same manner as the transistor 22, shown in FIG. 4. The only difference is that the transistor 22a is attached at the opposite end of the bottom electrode 20 than is the transistor 22. In addition there is a laser blowable fuse 82 located in the metal line which connects the conductive lead 32 to the source electrodes 28 of each of the transistors 22 and 22a and, similarly, there is a laser blowable fuse 84 located in the metal line which connects the conductive lead 30 to the gate electrodes 24 of each transistor.

The purpose of providing two transistors for each bottom pixel electrode 20 is to provide redundancy. If one of the two transistors does not work, chances are good that the other one will, and thus that the pixel will continue to be able to operate. During fabrication of a display having pixels with two transistors, each of the transistors is tested. If both work, one of them is disconnected by means of a laser which blows its associated fuse 82, disconnecting it from operation. If both transistors are functional, it is desirable to remove one of them from operation, since each of the transistors allows a small amount of leakage current when turned off, and two transistors have twice as much leakage as one. If, however, during testing, it is found that one of the transistors is faulty, that transistor is removed from operation and the other transistor is allowed to remain in operation, so that its associated pixel can continue to function. The laser blowable fuses 84 enables the gates 24 of transistors which are not to be used to be removed from operation. This enables the gate capacitance associated with unused transistors to be removed from the lead 30 and, in cases in which a defective transistor has a short between its gate and drain, it enables the shorted gate electrode to be disconnected from operation.

Although FIG. 13 only shows one row of such dual transistor pixel electrodes, it is to be understood that such a dual transistor arrangement is used in displays having multiple rows, and in displays, similar to that shown in FIG. 10, having combined source-gate lines between rows of pixel.

From the foregoing it is apparent that a light influencing display can be constructed in which each pixel has a separately actualable three terminal device associated with it and yet which does not require crossing address lines on any given substrate. Although the description of the preferred embodiments described above relates to liquid crystal displays, it is to be understood that the invention is applicable to other types of light influencing displays as well, such as electroluminiscent and electrochromic displays. In the preferred embodiments described above, data voltages are supplied to all the pixels of a selected row in parallel. However, it should be understood that the present invention also applies to light influencing displays in which a data voltage is supplied to only one pixel in a selected row at a time, while the data leads connected to the other pixels in the selected row are allowed to have their voltages float. It should also be understood that the present invention is applicable to displays in which the pixels can show gray values as well as the on and off values described above. Such gray values can be achieved by selecting the preselected voltage and the data voltage supplied to the electrodes of a given pixel so that the voltage applied across that pixel is sufficient to only partially change the optical properties of its light influencing material. Similarly it is to be recognized that those skilled in the art may make various other modifications or additions to the preferred embodiments chosen to illustrate the invention without departing from the spirit and scope of the present contribution to the art.

What is claimed is:

1. A light influencing display comprising:
   first and second insulative surfaces;
   a plurality of pixels, each including a first electrode formed on the first surface and an opposing second electrode formed on the second surface, with said pixels being divided into a plurality of pixel groups, each consisting of a separate plurality of pixels;
   a corresponding plurality of three terminal control devices formed of deposited semiconductor material on the first surface, with one such control device being formed in asociatation with each of said pixels, with each control device having two current path terminals and a control terminal which controls the conductivity between those two current path terminals, and with a first of the current path terminals of each control device being connected to the first pixel electrode of its associated pixel;
   a separate conductive voltage supply lead formed on the first surface in association with each of said pixel groups, with each of said voltage supply leads being connected to the second current path terminals of the control devices associated with its pixel group;

a separate conductive control lead formed on the first surface in association with each of said pixel groups, with each of said control leads being connected to the control terminals of the control devices associated with its pixel group;

a plurality of conductive data leads formed on the second surface, with a different one of such data leads being electrically connected to each separate second pixel electrode of a given pixel group for selectively supplying data voltages to the second pixel electrodes of said given group, with individual ones of such data leads being connected to at least one second pixel electrode in each of a plurality of pixel groups;

light influencing display material disposed between the first and second electrodes of each pixel; and the voltage supply leads and the control leads not crossing each other;

whereby a desired voltage can be applied between the electrodes of a given pixel by using a selected control lead to turn on the conductivity of the control device associated with its pixel group, thus effectively connecting the pixel's first electrode to a voltage supply lead, and by using a selected data lead to supply a selected voltage to the pixel's second electrode.

2. A light influencing display as described in claim 1, including a first substrate, wherein said first insulative surface is a surface of said first substrate.

3. A light influencing display as described in claim 2, including a second substrate spaced from and substantially parallel to said first substrate, wherein said second insulative surface is a surface of said second substrate.

4. A light influencing display as described in claim 1, wherein said light influencing display material is liquid crystal material.

5. A light influencing display as described in claim 1, wherein said control devices are transistors.

6. A light influencing display as described in claim 5, wherein said transistors are thin film field effect transistors and said current path terminals are source electrodes and drain electrodes.

7. A light influencing display as described in claim 6, wherein said thin film transistors have channel regions formed of deposited semiconductor material.

8. A light influencing display as described in claim 7, wherein said semiconductor material includes silicon.

9. A light influencing display as described in claim 8, wherein said semiconductor material is an amorphous alloy of silicon.

10. A light influencing display as described in claim 9, wherein said amorphous alloy includes hydrogen.

11. A light influencing display as described in claim 10, wherein said amorphous alloy includes fluorine.

12. A light influencing display as described in claim 9, wherein said amorphous alloy includes fluorine.

13. A light influencing display as described in claim 1, wherein each first pixel electrode has two of said three terminal control devices formed in association with it to provide redundancy.

14. A light influencing display as described in claim 13, wherein at least one of the two control devices formed in association with each first pixel electrode has a laser blowable fuse connected to at least one of its electrodes to enable it to be removed from effective operation.

15. A light influencing display as described in claim 1, wherein the voltage supply lead associated with one pixel group functions as the control lead associated with another pixel group.

16. A light influencing display as described in claim 1, wherein the pixels in each pixel group are arranged to form a pixel row.

17. A light influencing display as described in claim 16, wherein the voltage supply lead and control lead associated with each pixel row form two parallel conductive lines extending in the direction of that row.

18. A light influencing display as described in claim 16, wherein the pixels are arranged in an x-y array having both rows and columns, so that each pixel belongs both to a pixel row and a pixel column.

19. A light influencing display as described in claim 18 wherein a given data lead is connected to each of the second pixel electrodes in a given pixel column, so that by selectively supplying the proper voltage through a control lead associated with a selected pixel row, and by supplying a voltage through a data lead connected to a selected pixel column, the pixel at the intersection of the selected row and column has a voltage applied across it.

20. A light influencing display as described in claim 16, wherein each pixel row has associated with it one voltage supply lead and one control lead in addition to the voltage supply and control leads of any other pixel rows, so that each additional pixel row requires two additional conductive leads.

21. A light influencing display as described in claim 16, wherein:

the pixel rows are adjacent to one another; and the voltage supply lead associated with one pixel row also functions as the control lead associated with an adjacent pixel row, so that each additional pixel row only requires one additional conductive lead.

22. A subassembly for use in a light influencing display comprising:

a first insulative surface;

a plurality of first pixel electrodes formed on the first surface, with said pixel electrodes being divided into a plurality of pixel electrode groups, each consisting of a separate plurality of pixel electrodes;

a corresponding plurality of three terminal control devices formed of deposited semiconductor material on the first surface, with one such control device being formed in association with each of said pixel electrodes, with each control device having two current path terminals and a control terminal which controls the conductivity between those two current path terminals, and with a first of the urrent path terminals of each control device being connected to its associated first pixel electrode;

a separate conductive voltage supply lead formed on the first surface in association with each of said pixel electrode groups, with each of said voltage supply leads being connected to the second current path terminals of the control devices associated with its electrode group;

a separate conductive control lead formed on the first surface in association with each of said pixel electrode groups, with each of said control leads being connected to the control terminals of the control devices associated with its electrode group; and the voltage supply leads and the current control leads not crossing each other.

23. A subassembly for use in a light influencing display as described in claim 22, including a first substrate, wherein said first surface is a surface of the first substrate.

24. A subassembly for use in a light influencing display as described in claim 22, wherein said control devices are transistors.

25. A subassembly for use in a light influencing display as described in claim 24, wherein said transistors are thin film field effect transistors and said current path terminals are source electrodes and drain electrodes.

26. A subassembly for use in a light influencing display as described in claim 22, wherein said thin film transistors have channel regions formed of deposited semiconductor material.

27. A subassembly for use in a light influencing display as described in claim 26, wherein said semiconductor material includes silicon.

28. A subassembly for use in a light influencing display as described in claim 27, wherein said semiconductor material is an amorphous alloy of silicon.

29. A subassembly for use in a light influencing display as described in claim 28, wherein said amorphous alloy includes hydrogen.

30. A subassembly for use in a light influencing display as described in claim 29, wherein said amorphous alloy includes fluorine.

31. A subassembly for use in a light influencing display as described in claim 28, wherein said amorphous alloy includes fluorine.

32. A subassembly for use in a light influencing display as described in claim 31, wherein each first pixel electrode has two of said three terminal control devices formed in association with it to provide redundancy.

33. A subassembly for use in a light influencing display as described in claim 32, wherein at least one of the two control devices formed in association with each first pixel electrode has a laser blowable fuse connected to at least one of its electrodes to enable it to be removed from effective operation.

34. A subassembly for use in a light influencing display as described in claim 22, wherein the voltage supply lead associated with one pixel electrode group functions as the control lead associated with another pixel electrode group.

35. A subassembly for use in a light influencing display as described in claim 22, wherein the pixel electrodes in each pixel electrode group are arranged to form an electrode row.

36. A subassembly for use in a light influencing display as described in claim 35, wherein the voltage supply lead and control lead associated with each electrode row form two parallel conductive lines extending in the direction of that row.

37. A subassembly for use in a light influencing display as described in claim 35, wherein the pixel electrodes are arranged in an x-y array having both rows and columns, so that each pixel electrode belongs both to an electrode row and an electrode column.

38. A subassembly for use in a light influencing display as described in claim 35, wherein each electrode row has associated with it one voltage supply lead and one control lead in addition to the voltage supply and control leads of any other electrode rows, so that each additional electrode row requires two additional conductive leads.

39. A subassembly for use in a light influencing display as described in claim 35, wherein:
the electrode rows are adjacent to one another; and
the voltage supply lead associated with one electrode row also functions as the control lead associated with an adjacent electrode row, so that each additional electrode row only requires one additional conductive lead.

* * * * *